United States Patent
Gao et al.

(10) Patent No.: US 10,346,716 B2
(45) Date of Patent: Jul. 9, 2019

(54) FAST JOINT TEMPLATE MACHINING

(71) Applicant: International Business Machines Corporation, Armonk, NY (US)

(72) Inventors: Peng Gao, Beijing (CN); Guo Qiang Hu, Shanghai (CN); Jing Chang Huang, Shanghai (CN); Jun Chi Yan, Shanghai (CN); Jun Zhu, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 106 days.

(21) Appl. No.: 15/706,610

(22) Filed: Sep. 15, 2017

(65) Prior Publication Data

US 2019/0087684 A1    Mar. 21, 2019

(51) Int. Cl.
| | |
|---|---|
| *G06K 9/46* | (2006.01) |
| *G06K 9/62* | (2006.01) |
| *G06T 7/73* | (2017.01) |
| *G06T 7/00* | (2017.01) |
| *G06K 9/68* | (2006.01) |

(52) U.S. Cl.
CPC ......... *G06K 9/6202* (2013.01); *G06K 9/4671* (2013.01); *G06K 9/6215* (2013.01); *G06K 9/6272* (2013.01); *G06K 9/6857* (2013.01); *G06T 7/001* (2013.01); *G06T 7/74* (2017.01)

(58) Field of Classification Search
None
See application file for complete search history.

(56) References Cited

U.S. PATENT DOCUMENTS

| | | | |
|---|---|---|---|
| 5,077,805 A | * | 12/1991 | Tan ............... G06K 9/6857 382/137 |
| 6,122,628 A | * | 9/2000 | Castelli ............ G06K 9/6222 |
| 7,636,478 B2 | | 12/2009 | Bryll |
| 9,349,076 B1 | | 5/2016 | Liu et al. |
| 9,576,221 B2 | | 2/2017 | Mayle et al. |
| 2012/0082385 A1 | | 4/2012 | Xu |
| 2016/0104042 A1 | | 4/2016 | Romanik et al. |

OTHER PUBLICATIONS

Mohr, "Continuous Edge Gradient-Based Template Matching for Articulated Objects," TU Clausthal, Department of Informatics, Clausthal University of Technology, Sep. 2001, pp. 1-20.
Lee, "Learning and Matching Multiscale Template Descriptors for Real-Time Detection, Localization and Tracking," Computer Science Department University of California, pp. 1457-1464.

* cited by examiner

*Primary Examiner* — Mark Roz
(74) *Attorney, Agent, or Firm* — Intelletek Law Group, PLLC; Gabriel Daniel, Esq.

(57) ABSTRACT

An efficient method and apparatus for identifying one or more targets in an image is presented. A matching operation is performed that compares the image against multiple templates jointly. The multiple templates are sorted into multiple clusters. The joint template matching operation achieves an improvement in performance by focusing on a subset of the clusters. For each grid location, clusters whose reference templates have low matching scores with the image content of the grid location are bypassed or excluded from the matching operation. This saving in computation load is made possible by the clustering of the templates, which can be performed offline and does not affect the performance of the joint template matching operation.

17 Claims, 9 Drawing Sheets

Cluster 2 can be bypassed if the best score for Cluster 2 is worse than the worst score for Cluster 1 (or worse than the worst score of any other cluster)

Cluster 1 can be bypassed if the best score for Cluster 1 is worse than the worst score for Cluster 2 (or worse than the worst score of any other cluster)

*FIG. 7*

FAST JOINT TEMPLATE MACHINING

BACKGROUND

Technical Field

The present disclosure generally relates to image processing and object recognition.

Description of the Related Art

For visual analytics, template matching is a core capability for performing different types of image searches, such as searches for similar or duplicate images or objects. These searches can be used for indexing and clustering of samples, object detection, localization, classification, and geometry measuring. Template matching can also incorporate different features for similarity computing as a working pipeline.

SUMMARY

Some embodiments of the disclosure provide a method or apparatus for identifying one or more targets in an image. A computing device receives an image and a plurality of templates. The templates are sorted into a plurality of clusters of templates. Each cluster is associated with a reference template. Each template of the cluster differs with the reference template of the cluster by less than a radius of the cluster. The computing device identifies a plurality of grid locations in the received image. For each grid location of the image, the computing device (i) compares the reference template of each of the plurality of clusters with the image content of the grid location to produce a matching score for the reference template, (ii) selects one or more clusters based on the matching scores of the reference templates of the plurality of clusters for the grid location; and (iii) compares each template of each selected cluster with the image content of the grid location to determine whether the template matches the image content of the grid location. The computing device then reports information based on the comparisons between the plurality of templates and the image content of the plurality of grid locations.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 7 conceptually illustrates identification of bypass clusters for all grid locations of the test image, consistent with an exemplary embodiment.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide an efficient method for identifying one or more targets in an image. The method performs a matching operation that compares the image against multiple templates jointly. The multiple templates are sorted into multiple clusters. The joint template matching operation achieves an improvement in performance by focusing on a subset of the clusters. For each grid location, clusters whose reference templates have low matching scores with the image content of the grid location are bypassed or excluded from the matching operation. This saving in computation load is made possible by the clustering of the templates, which can be performed offline (prior to the matching operation) and not affect the performance of the joint template matching operation.

Figure 1:
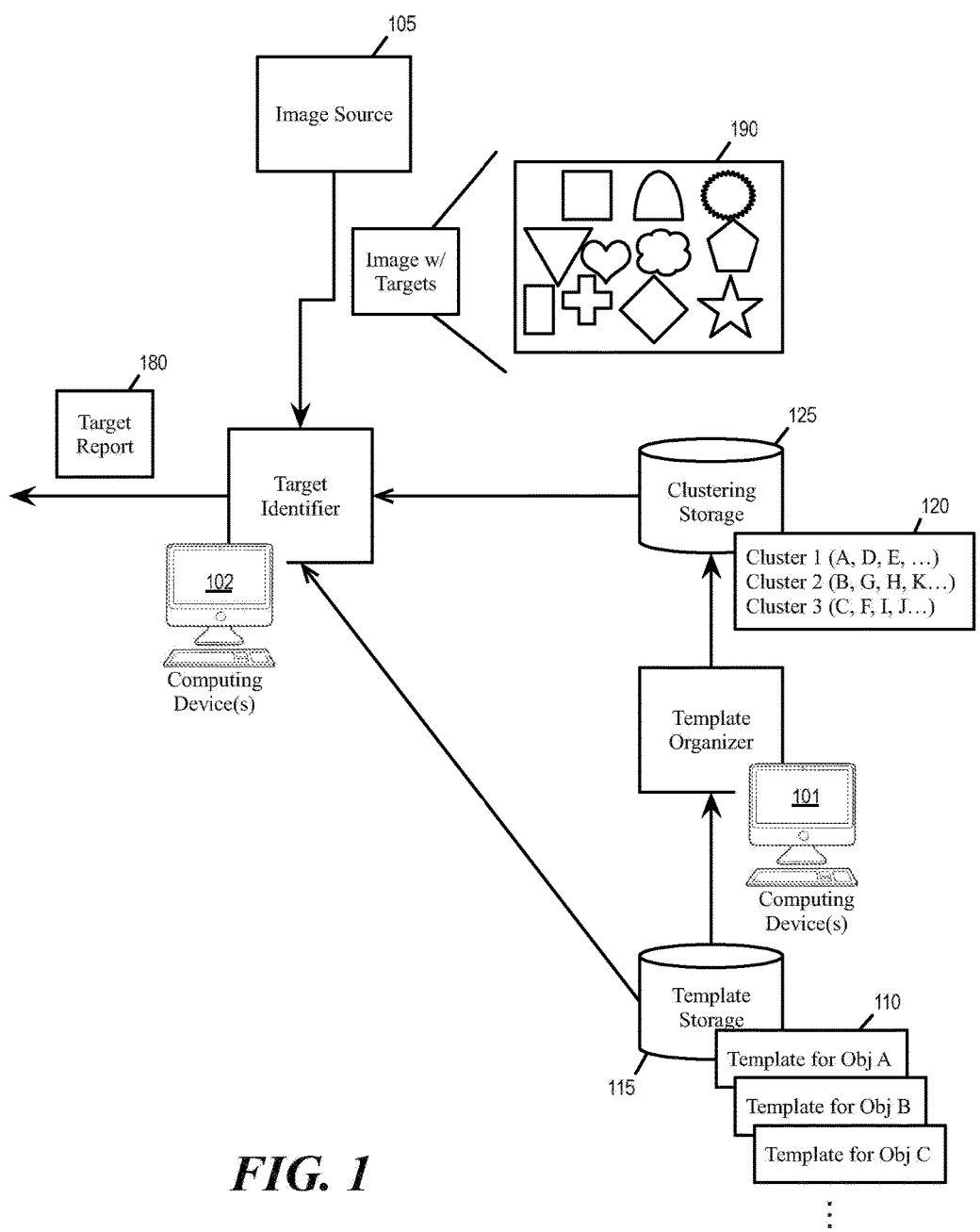
FIG. 1 illustrates a template-based image target identification method, consistent with an exemplary embodiment.

FIG. 1 illustrates a template-based image target identification method, consistent with an exemplary embodiment of the disclosure. The method provides a set of templates 110 that are organized into clusters. The method uses the clustered templates to identify matching target objects in a test image 190 (or an image with potential target objects). As illustrated, the method is implemented by a computing device 101 that organizes templates into clusters and a computing device 102 that uses the clustered templates to identify matching targets in the test image.

An image source 105 provides the test image 190. The image source 105 may provide the test image as part of a sequence of images of a video. The image source 105 may also provide the test image 190 as a stand-alone still image, such as a photograph taken of a human body or of an electronic device for diagnostic purposes. The test image 190 may include image content that resemble one or more target objects that are to be identified through matching operation using the templates 110.

The computing device(s) 101 (labeled as template organizer in the figure) receives templates 110 (from a template storage 115). Each of these templates provides guidelines or sample image content for identifying a specific object or a specific type of objects in an image. The template-organizing computing device 101 groups or sorts the received templates into clusters of templates. As illustrated, the templates 110 includes templates for identifying objects A, B, C, etc., and the template-organizing computing device 101 processes the templates 110 to group them into clusters 1, 2, 3, etc., each cluster of templates including one or more of the templates 110. The information regarding the clusters of templates is recorded as clustering information 120 (stored in clustering storage 125). The grouping of templates into clusters will be further described in Section I below.

The computing device(s) 102 (labeled as target identifier in the figure) retrieves templates 110 from the storage 115 for identifying targets in the test image 190 by performing matching operations between the test image 190 and the retrieved templates. The computing device 102 may select only a subset of the templates 110 for the matching operations, thereby accelerating the matching operations by avoiding matching operations for the unselected templates. The selection of the subset of templates 110 is based on the clustering information 120 stored in the storage 125. The target-identifying computing device 102 generates a target report 180 that identifies the target objects in the test image 190 and their corresponding locations/positions in the test image 190. The clustering-based template selection and matching operations will be further described in Section II below.

The computing devices 101 and 102 may be different devices that perform the template-organizing and the target-identifying operations at different locations and/or at different times. The computing devices 101 and 102 may also be the same device that performs both types of operations. In some embodiments, the computing devices 101 perform the template organizing operations to generate the clustering information 120 for distribution and use by multiple different computing devices (e.g., including the computing device 102) for subsequent target-identifying operations. The target-identifying operations can be considered as "on-line" real-time operations where performance and/or latency are critical, while the template-organizing operations are "off-line" operations where performance and/or latency are not critical.

The computing device 102 may also be equipped with communications and/or network circuits for receiving templates and clustering information from the template storage 115 and/or the clustering storage 125. The clustering storage 125 and the template storage 115 may also be storage devices that are part of the computing device 102. The cluster storage 125 and the template storage 115 may also be within the same physical storage device.

I. Clustering of Templates

In some embodiments, standard clustering techniques are used to group the templates into clusters such that templates that are sufficiently similar to each other (e.g., having sufficiently high matching scores) are grouped as one cluster. In some embodiments, templates known for recognizing a same category of objects are grouped as one cluster (e.g., different views or perspective of a same object; small variations of a same visual pattern, etc.). Each cluster of templates is associated with a reference template. Each template of the cluster differs with the reference template of the cluster by less than a radius of the cluster.

Figure 2:
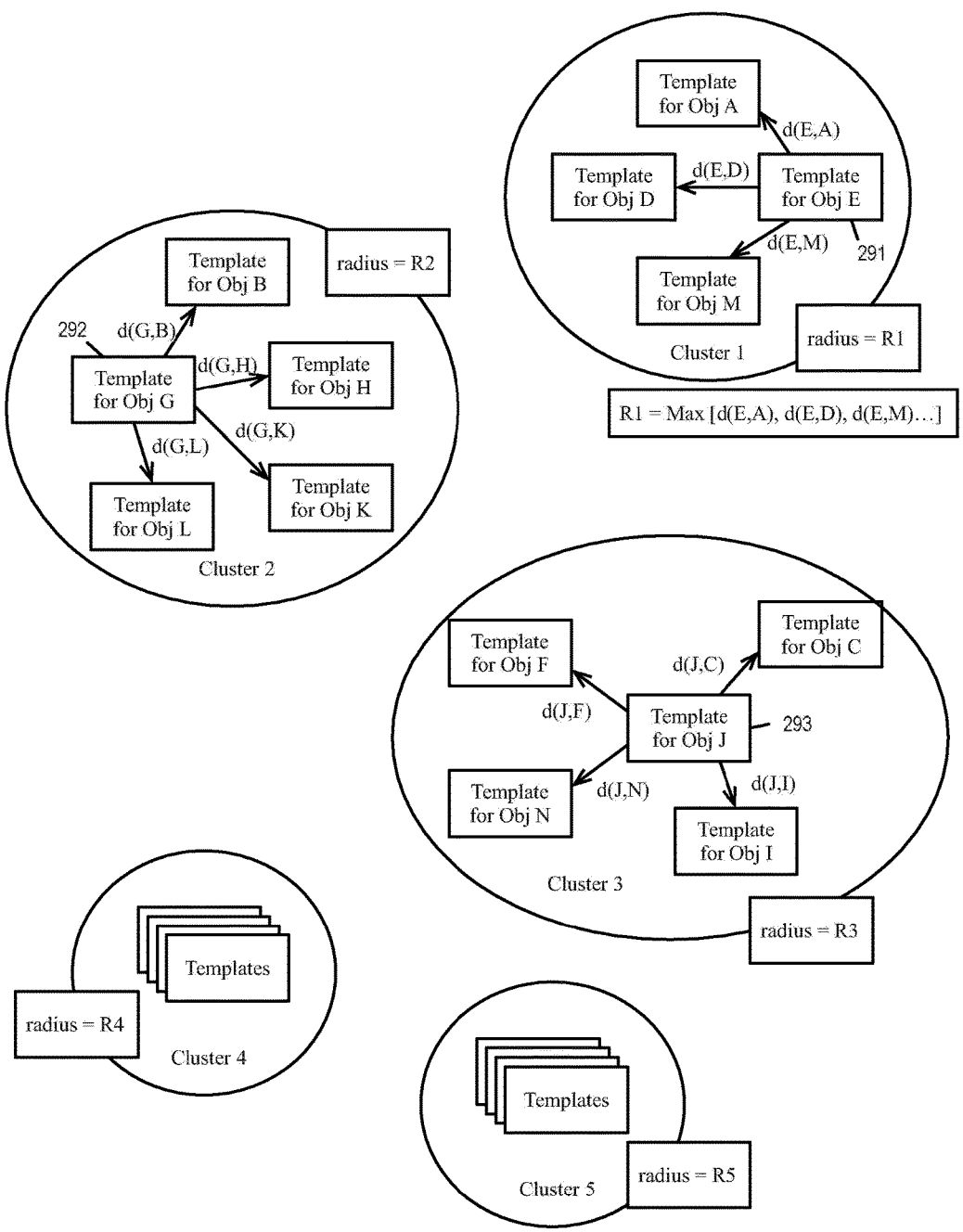
FIG. 2 conceptually illustrates the clustering of templates based on reference templates, consistent with an exemplary embodiment.

FIG. 2 conceptually illustrates the clustering of templates based on reference templates, consistent with an exemplary embodiment. The figure conceptually illustrates templates that are stored in the template storage 115 of FIG. 1. These templates include templates for objects A, B, C, D, E, F, G, H, I, J, K, L, M, and N, in addition to several more templates that are not labeled in the illustration. These templates are grouped into clusters 1, 2, 3, 4, and 5. Specifically, in the example of FIG. 2, cluster 1 includes templates for objects A, D, E, and M. Cluster 2 includes templates for objects B, G, H, K, and L. Cluster 3 includes templates for objects C, F, I, J, and N. Clusters 4 and 5 each include several templates that are not labeled.

Each cluster is associated with a reference template. In some embodiments, the template-organizing computing device 101 identifies the reference template of each cluster from among the templates of the cluster. In some embodiments, the template-organizing computing device 101 identifies several templates from among the templates 110 to serve as reference templates, and each identified reference template is in turn used to identify one or more templates from among the templates 110 to be in the cluster of the reference template. In the example illustrated in FIG. 2, the reference template of cluster 1 is template 291 (for object E), the reference template of cluster 2 is template 292 (for object G), and the reference template of cluster 3 is template 293 (for object J). (The reference templates of clusters 4 and 5 are not illustrated.)

For each cluster of templates, the template-organizing computing device 101 also determines a radius. For some embodiments, the radius of a cluster is determined based on the distances between the reference template of the cluster and the other (non-reference) templates of the cluster. A distance between any two templates may be defined based on a correlation score between the image content of the two templates, or other metrics for measuring the degree of similarity between the two templates. Larger distance values indicate a higher degree of dissimilarity or poorer matching score, while smaller distance values indicate a higher degree of similarity or better matching score.

The template-organizing computing device 101 computes the distance values between the reference template of the cluster and each of the other templates of the cluster. The largest distance value (i.e., the distance between the reference template and its poorest matching template in the cluster) is in turn identified as the radius or range of the cluster. In the example of FIG. 2, the radius of cluster 1 (R1) is defined as the largest distance value between the reference template 291 (the template for object E) and other templates in cluster 1 (templates for identifying objects A, D, and M). The radius for cluster 2 (R2) is defined as the largest distance value between the reference template 292 (the template for object G) and other templates in cluster 2 (templates for objects B, H, K, L). The radius of cluster 3 (R3) is defined as the largest distance value between the reference template 293 (the template for object J) and other templates in cluster 3 (templates for objects C, F, I, N). In some embodiments, the template-organizing computing device 101 selects the reference template of a cluster based on whether the choice of the reference template would result in the smallest possible radius for the cluster.

Figure 3:
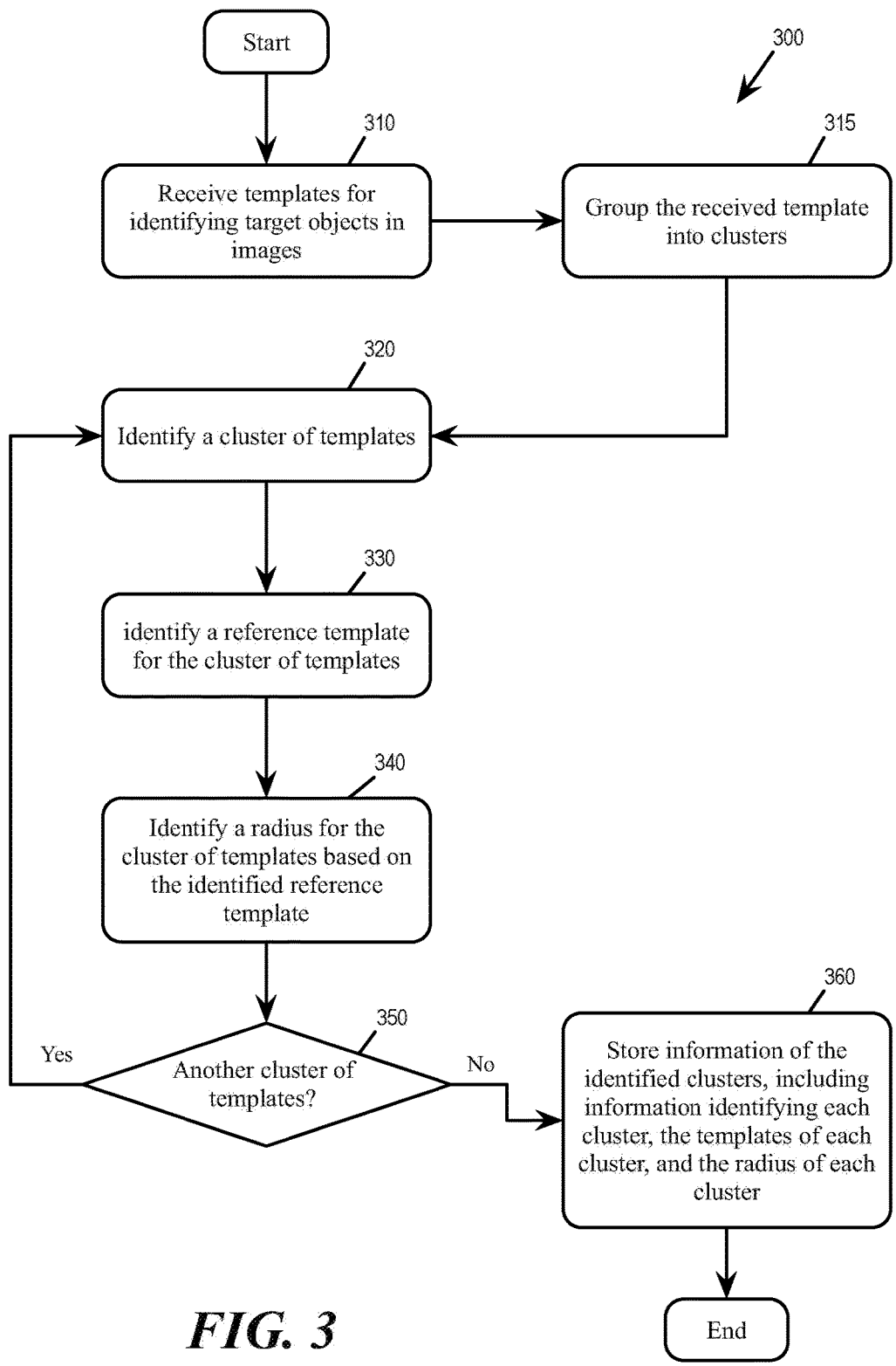
FIG. 3 conceptually illustrates a process for clustering templates and identifying reference templates, consistent with an exemplary embodiment.

FIG. 3 conceptually illustrates a process 300 for clustering templates and identifying reference templates, consistent with an exemplary embodiment. In some embodiments, the template-organizing computing device 101 performs the process 300 when it generates the clustering information 120. In some embodiments, one or more processing units (e.g., processor) of the template-organizing computing device 101 perform the process 300 by executing instructions stored in a computer readable medium.

The process 300 starts when the template-organizing computing device 101 receives (at 310) the templates 110 for identifying target objects in images (e.g., the test image 190). The template-organizing computing device 101 groups (at 315) the received templates into clusters, i.e., which templates belongs to the same cluster. The clustering of templates is described by reference to FIG. 2 above.

The template-organizing computing device 101 identifies (at 320) a cluster of templates. The template-organizing computing device 101 identifies (at 330) a reference template for the cluster. The template-organizing computing device 101 also determines (at 340) a radius for the cluster based on the distances between the reference template and other (non-reference) templates of the cluster. The identification of the reference template of a cluster and the determination of the radius of a cluster are described by reference to FIG. 2 above.

The template-organizing computing device 101 determines (at 350) whether there is another cluster whose reference template and radius have not been identified. If so, the process return to 320. If the reference template and radius for all clusters have been identified, the process proceeds to 360.

At 360, the template-organizing computing device 101 stores information of the identified clusters, including information identifying each cluster, the templates of each cluster, the reference template of each cluster, and the radius of each cluster, as the clustering information (120) of the received templates. The same computing device or another computing device can use the stored clustering information to identify target objects in test images at a later time. The process 300 then ends.

II. Matching Using Clustered Templates

The target-identifying computing device 102 divides the test image into grid locations. The grid locations are scanned one by one for image content that matches target objects according to the stored templates 110. For each grid location, rather than comparing the image content to every available template, the target-identifying computing device 102 uses the clustering information 120 to identify only a subset of the available templates for matching operations. Specifically, the target-identifying computing device 102 compares the image content of the grid location with templates of a few selected clusters while bypassing templates of other clusters.

In some embodiments, the target-identifying computing device 102 examines the reference template of each cluster to decide whether the cluster should be selected for matching operations with the image content of the grid location. Whether a cluster is to be bypassed or selected is determined based on a matching score or distance value between the reference template of the cluster and the image content of the grid location.

Figure 4:
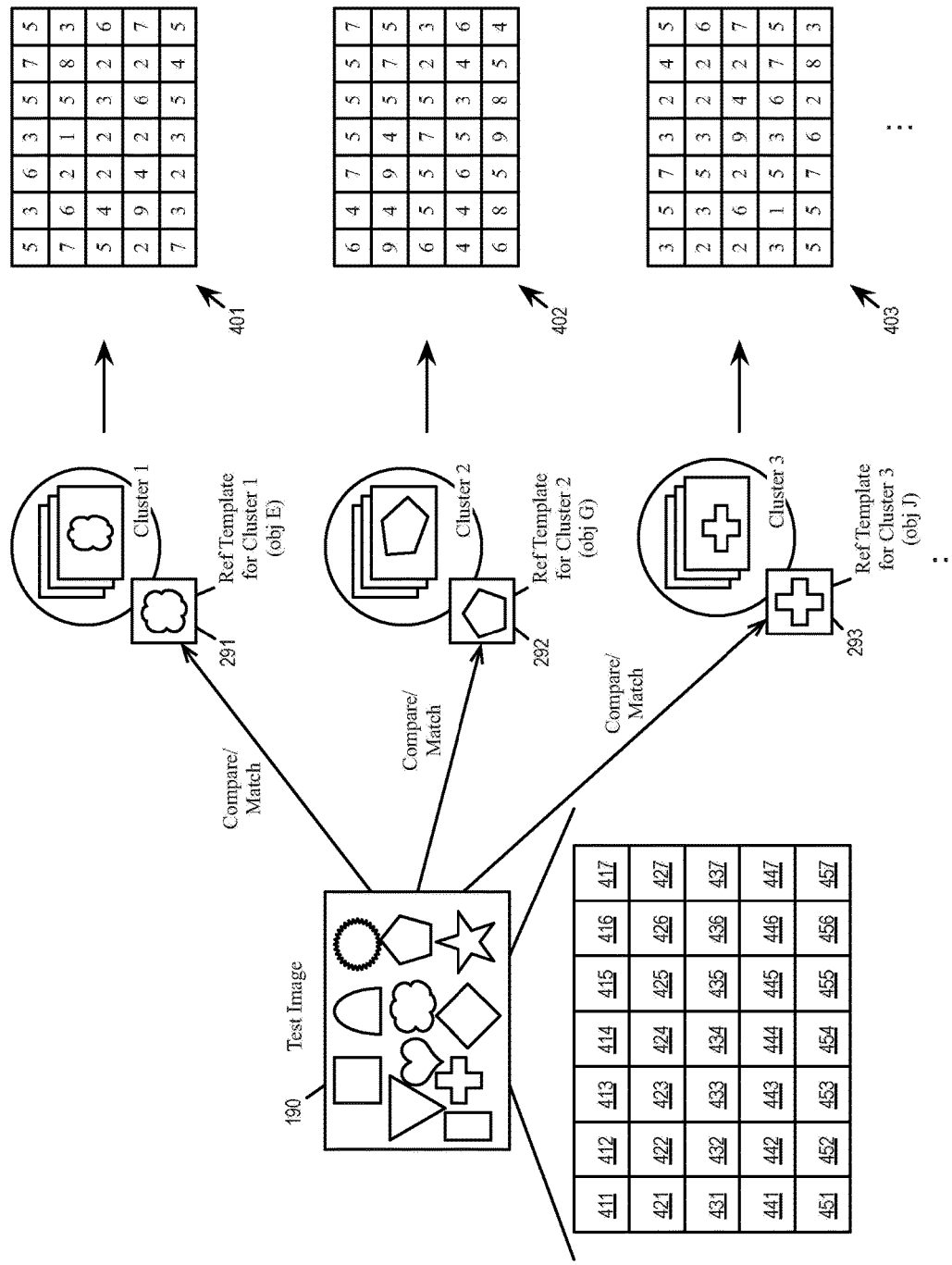
FIG. 4 conceptually illustrates the computation of matching scores or distance values for reference templates of different clusters at different grid locations of the test image, consistent with an exemplary embodiment.

FIG. 4 conceptually illustrates the computation of matching scores or distance values for reference templates of different clusters at different grid locations of the test image, consistent with an exemplary embodiment. The figure illustrates an example in which the test image 190 is divided into 7×5 grid locations (shown as grid locations 411-417, 421-427, 431-437, 441-447, and 451-457.) The image content of each grid location may overlap with the image content of its neighboring grid locations. (In other words, the grid locations may represent a sliding window over the test image 190.)

The target-identifying computing device 102 performs matching operations against the image content of the test image 190 for templates 291, 292, and 293, which are reference templates of clusters 1, 2, and 3, respectively (reference templates of other clusters are not illustrated). The result of the matching operations is illustrated as scores maps 401, 402, and 403 for the reference templates 291, 292, and 293, respectively. Each scores map shows the distance values or matching scores for all 7×5 grid locations of the test image 190. For example, at the grid location 424, the distance value between the reference template 291 and the image content is '1', according to scores map 401, the distance value between the reference template 292 and the image content is '4', according to scores map 402, and the distance value between the reference template 293 and the image content is '3', according to scores map 403. As another example, at the grid location 436, the distance values between the reference templates 291-293 and the image content are all '2' according to scores maps 401-403.

For each grid location, the target-identifying computing device 102 uses the distance values of the different reference templates to identify clusters that can be bypassed. In some embodiments, identifying clusters that can be bypassed for a given grid location involves computation of the best case score (upper bound matching score or smallest possible distance value) and the worst case score (lower bound matching score or largest possible distance value) of each cluster for that grid location. The best case and worst case scores of a cluster are computed based on the matching score of the cluster's reference template and the radius of the cluster. A cluster is identified as a bypass cluster for that grid location if the cluster's best possible score is worse than the worst possible score of another cluster at that grid location. Conversely, a cluster whose best case score at a grid location is not worse than any of the worst case scores of other clusters cannot be bypassed (hence selected for matching operations at the grid location).

In some embodiments, the best case score of a cluster is computed by subtracting the cluster's radius from a distance value of the cluster's reference template for the grid location and the best case score of the cluster is computed by adding the cluster's radius with the distance value of the cluster's reference template for the grid location. (The best case score is capped at zero distance value if the radius of the cluster is greater than the distance value of the reference template.)

Figure 5:
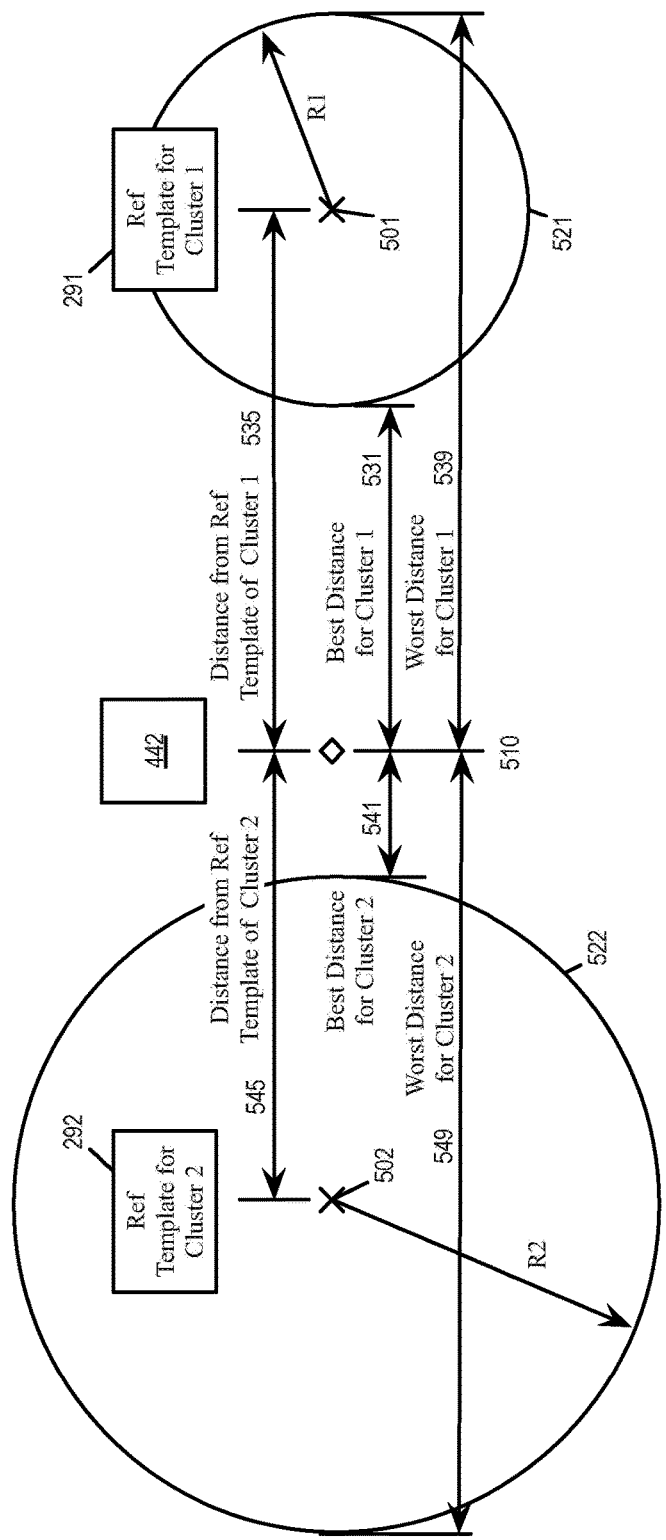
FIG. 5 conceptually illustrates a method for determining whether to bypass a cluster of templates for matching operations, consistent with an exemplary embodiment.

FIG. 5 conceptually illustrates a method for determining whether to bypass a cluster of templates for matching operations, consistent with an exemplary embodiment. The target-identifying computing device 102 can perform this method when performing matching operations to identify target objects in the test image 190 based on templates 110. The figure illustrates how a cluster of templates can be eliminated/bypassed from matching operations with the image content of a grid location. Specifically, The figure illustrates how to eliminate cluster 1 based on the best case scores of clusters 1 and the worst case score of cluster 2.

In the figure, the reference templates of clusters 1 and 2 and a given grid location of the test image (grid location 442 in the example) are represented as positions of a two-dimensional plane. The distances among the different positions represent the difference (or distance value/matching score) among the reference templates and the image content of the grid location. As illustrated, the position 501 corresponds to reference template 291 of cluster 1, the position 502 corresponds to reference template 292 of cluster 2, and the position 510 corresponds to the image content of the grid location 442.

The templates of cluster 1 are represented by a circle 521, which centers at the reference template 291 with radius R1. The circle 521 represents the range of possible positions that correspond to templates cluster 1. The distance 535 between the position 501 and the position 510 represents the distance value or the matching score for the reference template 291 at the grid location 442. The best possible score for the cluster 1 at the grid location 442 corresponds to the closest distance (distance 531) between the position 510 and the circle 521, i.e., the distance value 535 of the reference template 291 minus the radius R1 (The worst possible score for the cluster at the grid location 442 corresponds to the farthest distance 539 between the position 510 and the circle 521, i.e., the distance value 535 of the reference template 291 plus the radius R1.)

To determine whether cluster 1 should be bypassed or not, the computing device compares the best possible score of cluster 1 with the worst possible score of other clusters. If the best possible score of cluster 1 is worse than the worst possible score of any other cluster, then the templates of cluster 1 will be bypassed. In the example of FIG. 5, the best possible score of cluster 1 (distance 531) is compared with the worst possible score of cluster 2, which corresponds to the farthest distance 549 between the position 510 and the circle 522, i.e., the distance value of the reference template 291 plus the radius R2 of cluster 2. (The circle 522 represents the range of possible positions that correspond to templates cluster 1.)

Based on the example scores map 401 and 402 of FIG. 4, the matching score (distance value) for the reference template 291 of cluster 1 at the grid location 442 is '9', while the matching score for the reference template 292 of cluster 2 at the grid location 442 is '4'. The best score of cluster 1 is therefore 9−R1 while the worst score of cluster 2 is 4+R2. Thus, if 9−R1 is larger (worse) than 4+R2, cluster 1 can be bypassed for matching operations at grid location 442; otherwise, cluster 1 cannot be bypassed unless 9−R1 is worse than the worst score of another cluster at the grid location 442.

Figure 6:
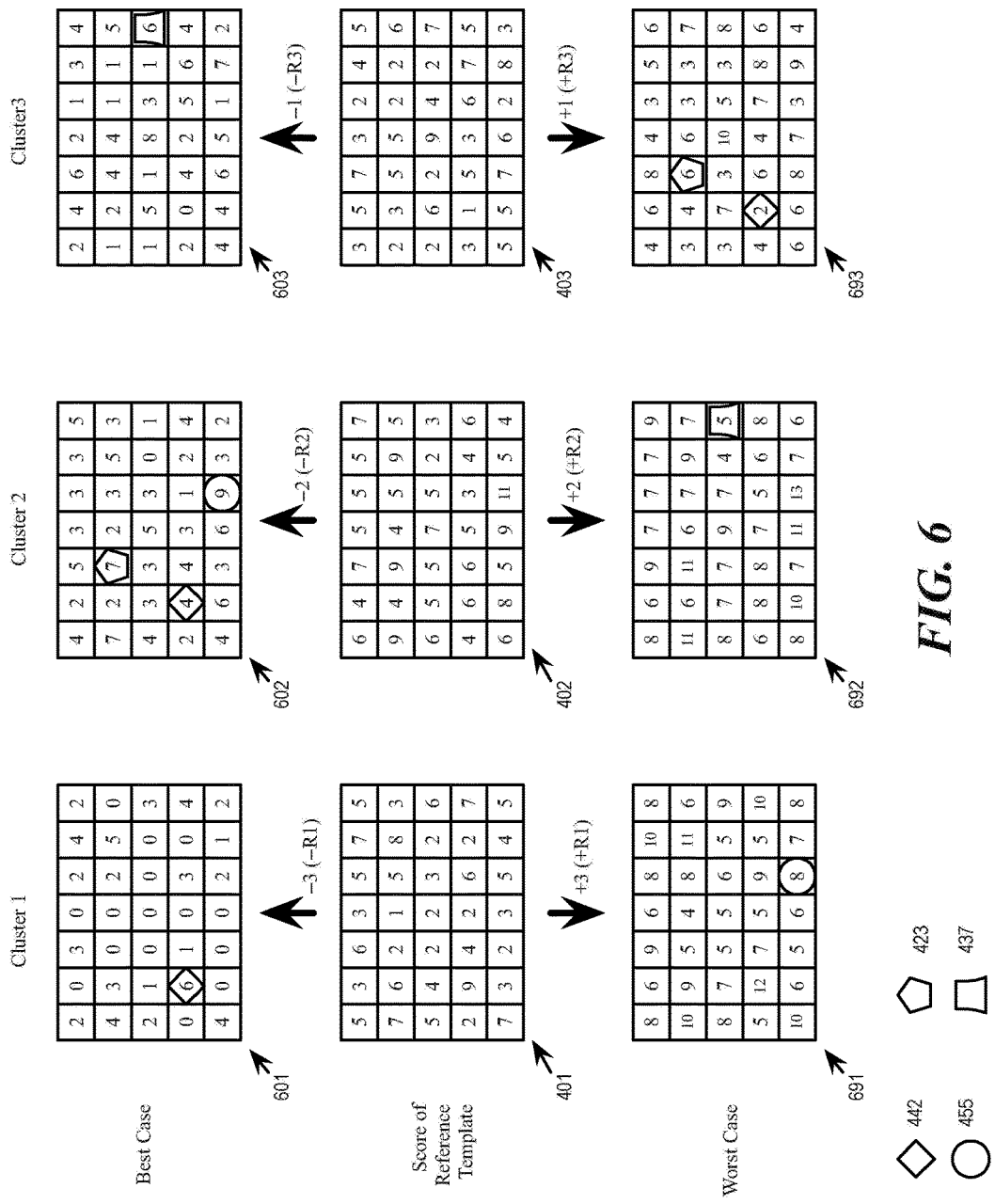
FIG. 6 illustrates example comparisons of best case and worst case scores of different clusters for identifying bypass clusters, consistent with an exemplary embodiment.

FIG. 6 illustrates example comparisons of best case and worst case scores of different clusters for identifying bypass clusters, consistent with an exemplary embodiment. For this example, the identification of bypass clusters is based on a comparison between clusters 1, 2, and 3 for all grid locations of the test image 190 (i.e., grid locations 411-417, 421-427, 431-437, 441-447, and 451-457). The radius R1 of cluster 1 is 3, the radius R2 of cluster 2 is 2, and the radius R3 of cluster 3 is 1. Comparisons based on other clusters are not illustrated.

The figure shows the scores map 401, 402, and 403 of reference templates 291, 292, and 293. Based on the values of R1, R2, and R3. The figure shows best case (upper bound) scores maps 601-603 for clusters 1, 2, and 3, respectively. The figure also shows the worst case (lower bound) scores maps 691-693 for clusters 1, 2, and 3, respectively.

The figure illustrates several grid locations in which a cluster can be eliminated (e.g., identified for bypass) because the cluster's best case score is worse than another cluster's worst case score: at grid location 423, cluster 2 can be bypassed because its best case score '7' is worse than the worst case score '6' for cluster 3; at grid location 455, cluster 2 can be bypassed because its best case score '9' is worse than the worst case score '8' of cluster 1; at grid location 437, cluster 3 can be bypassed because its best case score '6' is worse than the worst case score '5' of cluster 2; and at grid location 442, both clusters 1 and 2 can be bypassed because the best case score of cluster 1 and cluster 2 at the grid location ('6' and '4' respectively) are both worse than the worst score of cluster 3 ('2').

Figure 7:
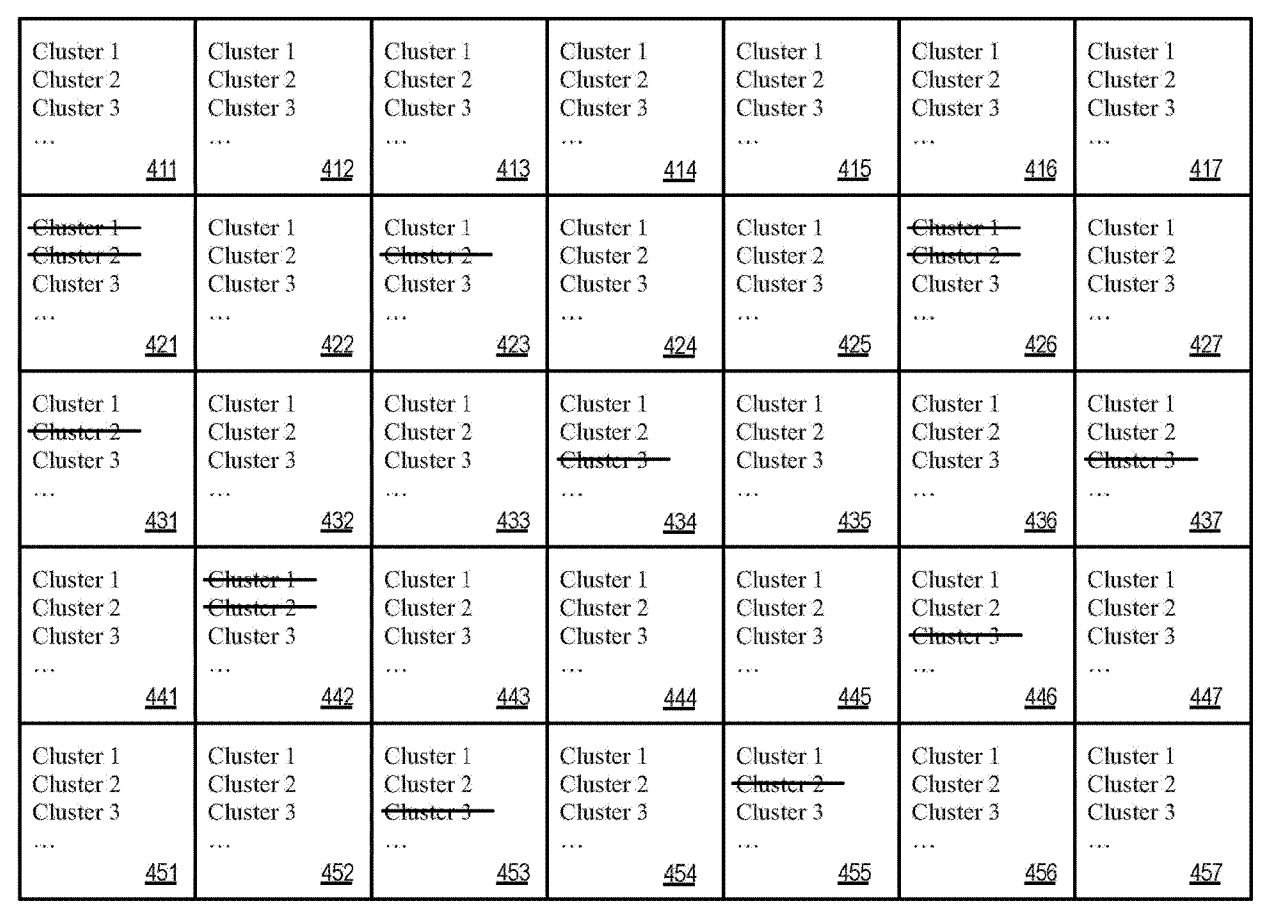

FIG. 7 conceptually illustrates identification of bypass clusters for all grid locations of the test image 190, consistent with an exemplary embodiment. For each grid location, clusters that are bypassed are illustrated with strike-through. For example, templates in cluster 3 are bypassed for grid location 455, and templates in both clusters 1 and 2 are bypassed for grid location 422, etc. Clusters not illustrated with strike-through cannot be bypassed.

Figure 8:
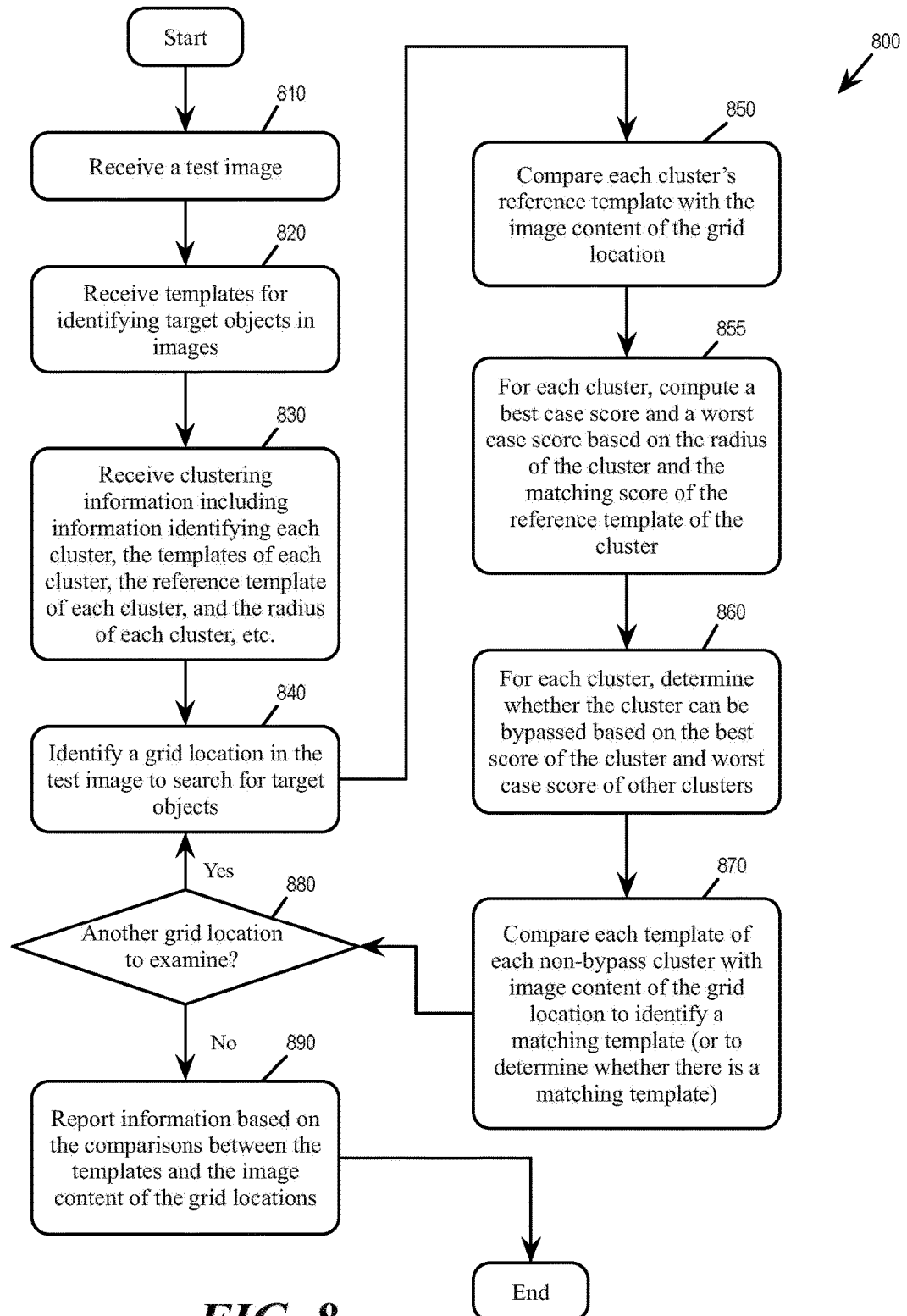
FIG. 8 conceptually illustrates a process for using clustered templates to identify target objects in a test image, consistent with an exemplary embodiment.

FIG. 8 conceptually illustrates a process 800 for using clustered templates to identify target objects in a test image, consistent with an exemplary embodiment. The process uses clustering information regarding the templates to identify clusters of templates to bypass during matching operations. In some embodiments, one or more processing units (e.g., processor) of the target-identifying computing device 102 perform the process 800 by executing instructions stored in a computer readable medium.

The process 800 starts when the target-identifying computing device 102 receives (at 810) a test image. The test image can be a still image or an image in a video. The test image is divided into grid locations (e.g., by the target-identifying computing device 102). Each grid location includes a piece of the image content of the test image. The image content of neighboring grid locations may overlap as grid locations represent a sliding window over the test image. The target-identifying computing device 102 receives (at 820) templates (e.g., templates 110 from the template storage 115) for identifying target objects in images. The target-identifying computing device 102 also receives (at 830) clustering information (e.g., by retrieving 120 from the clustering information storage 125) for the templates. The clustering information may include information identifying each cluster, the templates of each cluster, the reference template of each cluster, and the radius of each cluster, etc.

The target-identifying computing device 102 identifies (at 840) a grid location in the test image to search for target objects based on the templates. The target-identifying computing device 102 then compares (at 850) each cluster's reference template with the image content of the identified grid location to produce a matching score (e.g., distance value based on correlation). For each cluster, the target-identifying computing device 102 computes (at 855) a best case score and a worst case score at the grid location based on the radius of the cluster and the matching score of the cluster's reference template. For each cluster, the target-identifying computing device 102 determines (860) whether the cluster can be bypassed at the grid location based on the best case score of the cluster and the worst case scores of other clusters. Specifically, any cluster whose best case score is worse than the worst case score of any other cluster can be bypassed. The identification of bypass clusters is described by reference to FIG. 4-7.

The target-identifying computing device 102 then compares (at 870) each template of each non-bypass cluster with the image content of the grid location to identify a matching template (or to determine whether there is a matching template at all). In some embodiments, the target-identifying computing device 102 identifies any template having matching score better than a certain threshold (e.g., distance value less than a threshold value) as being a matching template. This operation may result in zero, one, or multiple matching template(s).

The target-identifying computing device 102 determines (at 880) whether there is another grid location to examine. If so, the process returns to 840 to examine another grid location and determine which clusters of template to bypass/select for comparison. If the current grid location is the last grid location, the process proceeds to 890.

The target-identifying computing device 102 reports (at 890) information based on the comparisons between the clustered templates and the image content of the grid locations. In some embodiments, such reported information may include which target objects were found in which grid locations based on which templates have matching scores better than a threshold at those grid locations. The process 800 then ends.

III. Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 3 and 8) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
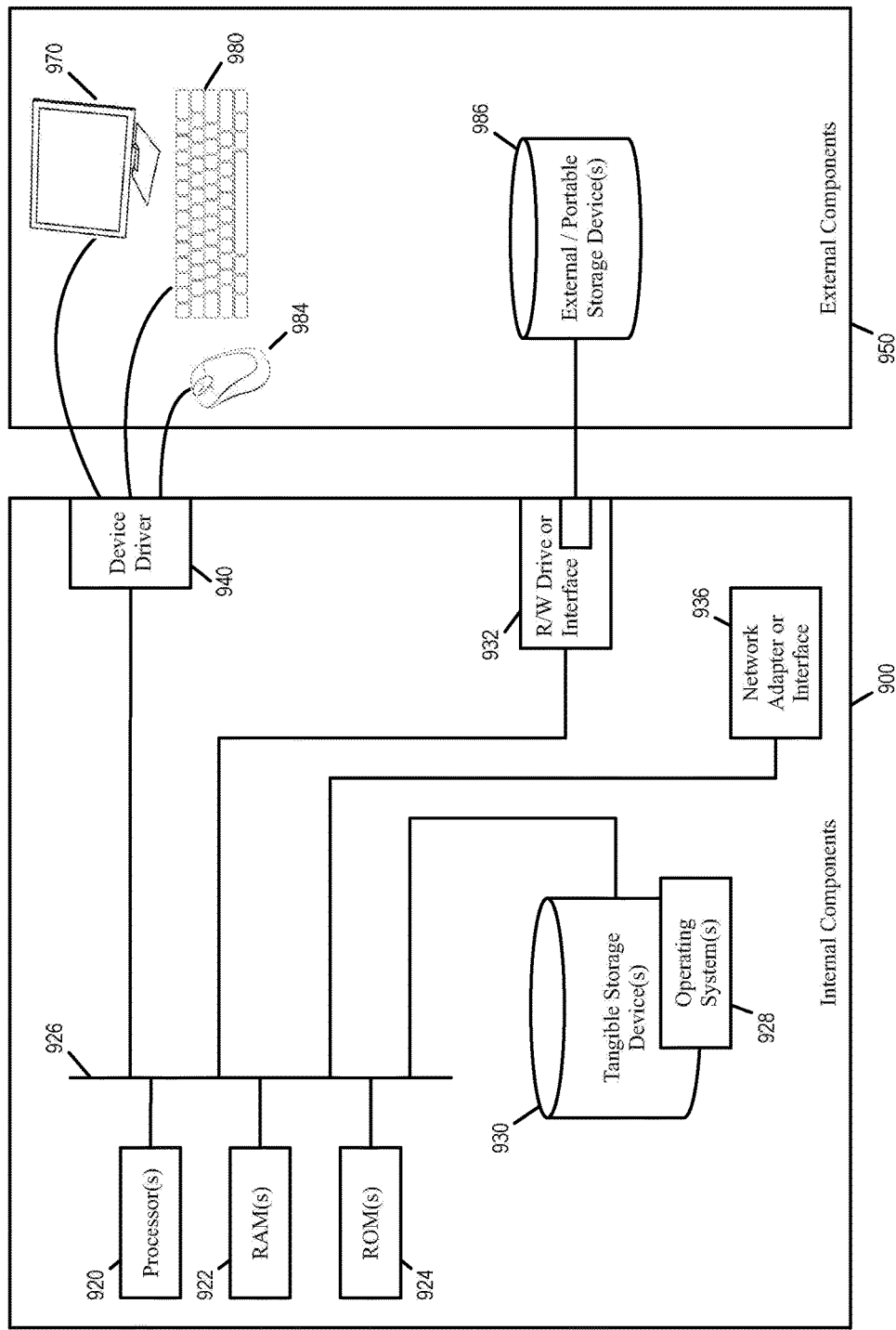
FIG. 9 shows a block diagram of the components of a data processing system in accordance with an illustrative embodiment of the present disclosure.

FIG. 9 shows a block diagram of the components of data processing systems 900 and 950 that may be used to implement a system for clustering templates and/or a system for identifying targets in a test bench based on clustered templates (e.g., the template-organizing computing device 101 and/or the target-identifying device 102) in accordance with an illustrative embodiment of the present disclosure. It should be appreciated that FIG. 9 provides only an illustration of one implementation and does not imply any limitations with regard to the environments in which different embodiments may be implemented. Many modifications to the depicted environments may be made based on design and implementation requirements.

Data processing systems 900 and 950 are representative of any electronic device capable of executing machine-readable program instructions Data processing systems 900 and 950 may be representative of a smart phone, a computer system, PDA, or other electronic devices. Examples of computing systems, environments, and/or configurations that may represented by data processing systems 900 and 950 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 900 and 950 may include a set of internal components 900 and a set of external components 950 illustrated in FIG. 9. The set of internal components 900 includes one or more processors 920, one or more computer-readable RAMs 922 and one or more computer-readable ROMs 924 on one or more buses 926, and one or more operating systems 928 and one or more computer-readable tangible storage devices 930. The one or more operating systems 928 and programs such as the programs for executing the processes 300 and 800 are stored on one or more computer-readable tangible storage devices 930 for execution by one or more processors 920 via one or more RAMs 922 (which typically include cache memory). In the embodiment illustrated in FIG. 9, each of the computer-readable tangible storage devices 930 is a magnetic disk storage device of an internal hard drive. Alternatively, each of the computer-readable tangible storage devices 930 is a semiconductor storage device such as ROM 924, EPROM, flash memory or any other computer-readable tangible storage device that can store a computer program and digital information.

The set of internal components 900 also includes a R/W drive or interface 932 to read from and write to one or more portable computer-readable tangible storage devices 986 such as a CD-ROM, DVD, memory stick, magnetic tape, magnetic disk, optical disk or semiconductor storage device. The instructions for executing the processes 300 and 800 can be stored on one or more of the respective portable computer-readable tangible storage devices 986, read via the respective R/W drive or interface 932 and loaded into the respective hard drive 930.

The set of internal components 900 may also include network adapters (or switch port cards) or interfaces 936 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 936. From the network adapters (or switch port adaptors) or interfaces 936, the instructions and data of the described programs or processes are loaded into the respective hard drive 930. The network may comprise copper wires, optical fibers, wireless transmission, routers, firewalls, switches, gateway computers and/or edge servers.

The set of external components 950 can include a computer display monitor 970, a keyboard 980, and a computer mouse 984. The set of external components 950 can also include touch screens, virtual keyboards, touch pads, pointing devices, and other human interface devices. The set of internal components 900 also includes device drivers 940 to interface to computer display monitor 970, keyboard 980 and computer mouse 984. The device drivers 940, R/W drive or interface 932 and network adapter or interface 936 comprise hardware and software (stored in storage device 930 and/or ROM 924).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an image;
   receiving a plurality of templates that are sorted into a plurality of clusters of templates, each cluster associated with a reference template, wherein each template of the cluster differs with the reference template of the cluster by less than a radius of the cluster;
   identifying a plurality of grid locations in the received image; and
   for each grid location of the image:
      comparing the reference template of each of the plurality of clusters with the image content of the grid location to produce a matching score for the reference template;
      selecting one or more clusters based on the matching scores of the reference templates of the plurality of clusters for the grid location; and
      comparing each template of each selected cluster with the image content of the grid location to determine whether the template matches the image content of the grid location; and
   reporting information based on the comparison between the plurality of templates and the image content of the plurality of grid locations for each grid location of the image and for each cluster, identifying a best case score and a worst case score for the cluster,
wherein the best case score of a cluster is computed by subtracting the cluster's radius from a distance value of the cluster's reference template for the grid location and the best case score of the cluster is computed by adding the cluster's radius with the distance value of the clusters reference template for the grid location.

2. The computer-implemented method of claim 1, further comprising:
for each grid location of the image and for each cluster, identifying a best case score and a worst case score for the cluster based on the matching score of the cluster's reference template for the grid location and the radius of the cluster.

3. The computer-implemented method of claim 2, wherein selecting one or more clusters based on the matching scores of the reference templates for the grid location comprises identifying a cluster to bypass based on the best case scores and worst case scores of the clusters, respectively, wherein the image content of the grid location is not compared with the templates of the identified cluster.

4. The computer-implemented method of claim 3, wherein a cluster is identified as a bypass cluster for the grid location when the cluster's best case score is worse than the worst score of another cluster for the grid location.

5. The computer-implemented method of claim 1, wherein the templates of each cluster are identified for recognizing a same category of targets.

6. The computer-implemented method of claim 1, further comprising receiving clustering information identifying each cluster, the templates of each cluster, the reference template of each cluster, and the radius of each cluster.

7. A computing device comprising:
a communications circuit configured to receive a plurality of templates that are sorted into a plurality of clusters of templates, each cluster associated with a reference template, wherein each template of the cluster differs with the reference template of the cluster by less than a radius of the cluster;
a set of processing units;
a storage device storing a set of instructions, wherein an execution of the set of instructions by the set of processing units configures the computing device to perform acts, comprising:
receiving an image comprising a plurality of, grid locations;
for each grid location of the image:
comparing the reference template of each of the plurality of clusters with the image content of the grid location to produce a matching score for the reference template;
selecting one or more clusters based on the matching scores of the reference templates of the plurality of clusters for the grid location; and
comparing each template of each selected cluster with the image content of the grid location to determine whether the template matches the image content of the grid location; and
reporting information based on the comparisons between the plurality of templates and the image content of the plurality of grid locations
for each grid location of the image and for each cluster, identifying a best case score and a worst case score for the cluster,
wherein the best case score of a cluster is computed by subtracting the cluster's radius from a distance value of the cluster's reference template for the grid location and the best case score of the cluster is computed by adding the cluster's radius with the distance value of the clusters reference template for the grid location.

8. The computing device of claim 7, wherein execution of the set of instructions further configures the computing device to perform acts comprising:
for each grid location of the image and for each cluster, identifying a best case score and a worst case score for the cluster based on the matching score of the cluster's reference template for the grid location and the radius of the cluster.

9. The computing device method of claim 8, wherein selecting one or more clusters based on the matching scores of the reference templates for the grid location comprises identifying a cluster to bypass based on the best case scores and worst case scores of the clusters, wherein the image content of the grid location is not compared with the templates of the identified cluster.

10. The computing device of claim 9, wherein a cluster is identified as a bypass cluster for the grid location when the cluster's best case score is worse than the worst score of another cluster for the grid location.

11. The computing device of claim 7, wherein the templates of each cluster are identified for recognizing a same category of targets.

12. The computing device of claim 7, wherein the communications circuit is further configured to receive clustering information identifying each cluster, the templates of each cluster, the reference template of each cluster, and the radius of each cluster.

13. A computer program product comprising:
one or more non-transitory computer-readable storage device and program instructions stored on at least one of the one or more non-transitory storage devices, the program instructions executable by a processor, the program instructions comprising sets of instructions for:
receiving an image;
receiving a plurality of templates that are sorted into a plurality of clusters of templates, each cluster associated with a reference template, wherein each template of the cluster differs with the reference template of the cluster by less than a radius of the cluster;
identifying a plurality of grid locations in the received image; and
for each grid location of the image:
comparing the reference template of each of the plurality of clusters with the image content of the grid location to produce a matching score for the reference template,
selecting one or more clusters based on the matching scores of the reference templates of the plurality of clusters for the grid location; and
comparing each template of each selected cluster with the image content of the grid location to determine whether the template matches the image content of the grid location; and
reporting information based on the comparison between the plurality of templates and the image content of the plurality of grid locations
for each grid location of the image and for each cluster, identifying a best case score and a worst case score for the cluster, wherein the best case score of a cluster is computed by subtracting the cluster's radius from a distance value of the cluster's reference template for the grid location and the best case score of the cluster is computed by adding the cluster's radius with the distance value of the clusters reference template for the grid location.

14. The computer program product of claim 13, wherein the program instructions further comprising sets of instructions for identifying a best case score and a worst case score for the cluster based on the matching score of the cluster's reference template for the grid location and the radius of the cluster for each grid location of the image and for each cluster.

15. The computer program product of claim 14, wherein selecting one or more clusters based on the matching scores of the reference templates for the grid location comprises identifying a cluster to bypass based on the best case scores and worst case scores of the clusters, wherein the image content of the grid location is not compared with the templates of the identified cluster.

16. The computer program product of claim 15, wherein a cluster is identified as a bypass cluster for the grid location when the cluster's best case score is worse than the worst score of another cluster for the grid location.

17. The computer program product of claim 13, wherein the program instructions further comprising sets of instructions for receiving clustering information identifying each cluster, the templates of each cluster, the reference template of each cluster, and the radius of each cluster.

* * * * *